United States Patent [19]

Manser et al.

[11] Patent Number: 5,101,717
[45] Date of Patent: Apr. 7, 1992

[54] PROCESS FOR PRODUCING LONG PASTA PRODUCTS AND APPARATUS FOR PERFORMING SUCH A PROCESS

[75] Inventors: Josef Manser, Uzwil; Friedrich Egger, Niederuzwil; Werner Seiler, Zuberwangen, all of Switzerland

[73] Assignee: Buhler AG, Uzwil, Switzerland

[21] Appl. No.: 436,938

[22] Filed: Nov. 14, 1989

Related U.S. Application Data

[60] Continuation of Ser. No. 48,628, May 11, 1987, abandoned, which is a division of Ser. No. 703,101, Feb. 15, 1985, abandoned.

[30] Foreign Application Priority Data

Jun. 24, 1983 [CH] Switzerland .................. 3459/83
Jan. 5, 1984 [DE] Fed. Rep. of Germany ....... 3400300

[51] Int. Cl.$^5$ ............... F26B 13/02; F26B 13/10; A23L 1/00
[52] U.S. Cl. .................... 99/474; 99/477; 99/486; 99/493; 99/468; 34/213
[58] Field of Search ............... 99/483, 484, 467, 468, 99/470, 474, 475, 486, 487, 493, 477, 447; 426/451, 455, 456, 458, 465, 510, 511; 34/209, 210, 212, 213, 50, 26; 26/55.1, 70, 106.8 V

[56] References Cited

U.S. PATENT DOCUMENTS

| | | | |
|---|---|---|---|
| 2,365,890 | 12/1944 | Mc Bean | 426/456 |
| 2,621,615 | 12/1952 | Lombardi | 426/451 |
| 2,704,723 | 3/1955 | Poole | 426/451 |
| 3,172,765 | 3/1965 | Carloni | 426/451 |
| 3,281,248 | 10/1966 | Fioraranti et al. | 426/451 |
| 3,537,862 | 11/1970 | Peters et al. | 426/451 |
| 3,663,232 | 5/1972 | Glabe | 426/557 |
| 3,908,029 | 9/1975 | Fredrichson | 426/557 |
| 3,961,569 | 6/1976 | Kenyon et al. | 99/483 |
| 4,136,608 | 1/1979 | Gladd et al. | 99/484 |
| 4,291,472 | 9/1981 | Lewis | 426/455 |
| 4,410,030 | 10/1983 | Skala | 99/470 |

FOREIGN PATENT DOCUMENTS

| | | | |
|---|---|---|---|
| 56708 | 12/1974 | Canada | 99/483 |
| 252328 | 9/1983 | France | 426/451 |
| 190699 | 11/1983 | Japan | 99/483 |
| 511063 | 8/1976 | U.S.S.R. | 426/451 |
| 2010661 | 7/1979 | United Kingdom | 426/557 |

*Primary Examiner*—Timothy F. Simone
*Assistant Examiner*—Joseph S. Machuga
*Attorney, Agent, or Firm*—Darby & Darby

[57] ABSTRACT

Figure 1:
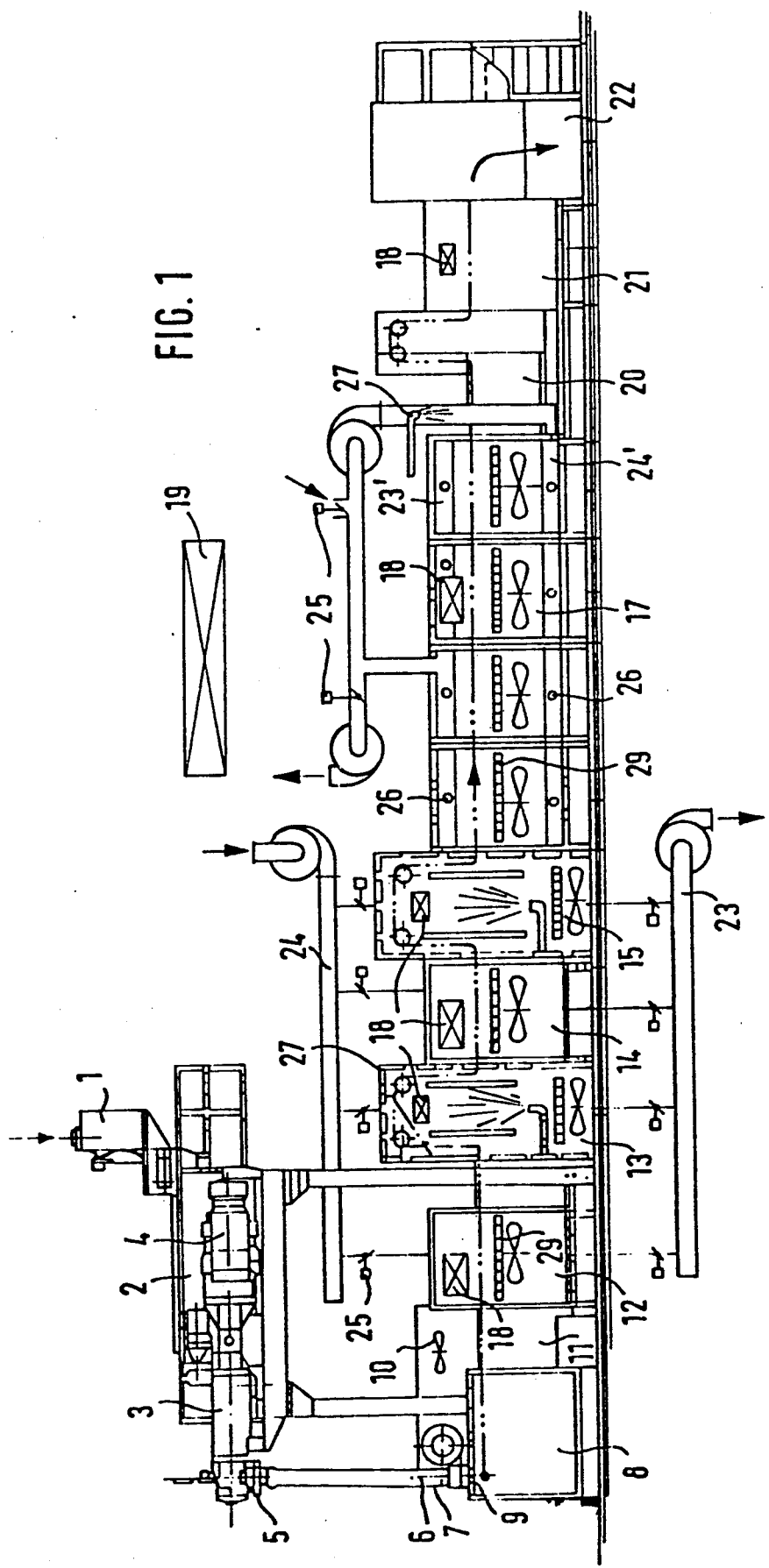

A description is provided of a process for producing long products with a moisture content of less than approximately 14% by weight and particularly approximately 11 to 13% by weight, the long product leaving the press head in the form of soft, moist-plastic dough strands being guided in suspended manner up to the final drying through varyingly heated climate zones and at the end of the drying process, the long product is cooled and/or dimensionally stabilized in a further climate zone. The long product leaving the press head is heated as rapidly as possible in a first climate zone, but in more than 10 minutes to a temperature of more than approximately 80° C. under the action of a heating medium with a relative humidity of approximately 60 to 80% and then in a second climate zone under the action of a drying medium with a temperature of over approximately 80° C. and a relative humidity of approximately 65 to 85% is dried to a moisture content of less than approximately 14% by weight, or to avoid undesired reactions over approximately 80° C. initially to a moisture content of less than approximately 18% by weight and then at a lower temperature to a final moisture content of less than approximately 14% by weight. This process can be performed extremely rapidly and supplies high-quality products. It can be performed with particular advantage in a single-level drier for drying the long products (FIG. 1).

5 Claims, 5 Drawing Sheets

PROCESS FOR PRODUCING LONG PASTA PRODUCTS AND APPARATUS FOR PERFORMING SUCH A PROCESS

TECHNICAL FIELD

This is a continuation of application Ser. No. 048,628, filed May 11, 1987 which is a division of Ser. No. 703,101 filed May 15, 1985, both applications now abandoned.

The invention relates to a product for producing long products with a moisture content of less than approximately 14% by weight and particularly approximately 11 to 13% by weight, the long product leaving the press head in the form of soft, moist-plastic dough strands being guided in suspended manner up to the final drying through varyingly heated climate zones and at the end of the drying process, the long product is cooled and/or dimensionally stabilized in a further climate zone.

BASIC PRIOR ART

Pasta products, particularly long pasta products or long products, apart from raw cereals and/or bread, are the most widely encountered basic foods and are extensively used particularly for storage or stockpiling purposes. They are ready-to-cook, dry cereal products, which are produced from wheat grits, dust or flour doughs, without using a fermentation or baking process, by moulding and careful drying. On the basis of the raw materials, a distinction is made between egg pasta products and egg-free pasta products, as well as grits and flour pasta products, whilst on the basis of their external appearance a distinction is made between noodles (ribbon macaroni, cut noodles and vermicelli), dumplings, macaroni (tubular noodles) and spaghetti. The main raw materials of the pasta products are durum wheat grits or dusts, which have a constant particle size distribution, high protein content, high content of yellow pigments (xanthophyll or esters thereof) and good pigment stability, whilst having a limited tendency to grey-brown discolouration.

For the production of pasta products, a dough is prepared from the cereal raw materials—grits or dust, usually mixed with one another and when the supply situation is unfavourable also flour, whilst also adding approximately 26 to 32% water, optionally salt, egg for dietetic pasta products, together with gluten and other protein products, shaping taking place by pressing or rolling and cutting, followed by the final drying. The water quantity and temperature, the mixing or kneading time and the control of drying are dependent on the nature of the raw material mixtures, the production principle and the special characteristics of the available machinery. The freshly shaped pasta product contains on average approximately 31% moisture, whereas the completely dried and packed product only contains approximately 11 to 13%.

In connection with the aforementioned pressing, it is fundamentally possible to adopt two different process procedures: a) the older batch process with the production of homogeneous, plastic doughs in a prekneader and grinding mill and shaping in hydraulic presses, or b) according to the modern continuous process with so-called screw presses, in which no homogeneous part is kneaded in the first section and instead merely a lumpy or crumbly dough material is formed in troughs using mixing paddle mechanisms and this is slowly passed on by conveyor screws and is supplied to the press head. It is only the shear forces in the pressout screw, as well as the high pressures of approximately 100 to 150 bar prevailing in the press chamber and during the passage of the dough through the die that bring about the necessary homogeneous kneading or "cementing" of the dough. The homogenized, kneaded, moist-plastic dough is forced out of the die in the form of a constant flow of completely shaped and structurally strongly compressed dough strands. A blower immediately dries the surface of the discharged dough strands, in order to remove their stickiness. Rotating blades can be positioned directly below the die and they cut the preshaped strands to the desired length. The strands obtained in this way must be dried for producing a durable product, the drying processing from the outside to the inside. It is important that the surface does not harden too long before the core, in order to prevent cracks and flaws in the finished pasta product. The freshly shaped pasta product has a water content of approximately 31%. As a result of the surface drying after leaving the press head scarcely 1% water is lost.

The control of the drying process still takes place on the basis of experience originally acquired in the Mediterranean area when drying in the open air with the cyclic changes of air movement, temperature and humidity which naturally occur there. The drying time during this drying process from shaping up to obtaining the final moisture content of the pasta product was 3 to 5 days, both for short and long pasta products.

During industrial production, the aforementioned drying conditions were simulated to the maximum possible extent, whilst seeking process optimization and in particular an acceleration of the drying process. This revealed numerous problems. Thus, the drying of the shaped dough is the final and technologically most problematical part of pasta production, particularly when in the form of long pasta products. Thus, it is a question of so controlling the water removal that the drying advances from the outside to the inside in such a way that the surface does not harden before the core, in order to prevent cracks and flaws in the finished pasta. This means that the surface should not harden before the core and that the moisture gradient between the layers should be limited. Drying at too high a temperature, low relative atmospheric humidity and strong air circulation leads to shrinkage stresses, which subsequently bring about cracks and flaws, together with a disintegration of the dry pasta products or a disintegration on cooking in pieces. Excessively slow drying at medium temperature, high relative atmospheric humidity and weak air circulation leads to radial distortion of the long pasta products hanging on the bars. This slow drying can lead to leavening.

It is clear that many points must be taken into consideration during the optimization of the drying of the long products.

Up to roughly one or two decades ago, a long product was only considered to be qualitatively completely satisfactory, if the drying temperature did not exceed 50° C. and the drying period was at least 18 to 24 hours. Of late, roughly the following procedure has been adopted. The long products leaving the press initially pass in a meandering manner through a predrier. Within 1 to 3 hours, the water content drops steeply to 20 to 24%, i.e. in the critical region of the pasta products passing from the plastic into the solid state. At this boundary, there is a sweating period which lasts several hours during which the treated product passes through drier zones without moisture removal. The residual water can be uniformly distributed from the core over the entire cross-section of the individual shaped pieces. The following final drying takes pace more slowly and carefully than the predrying to a moisture content of approximately 11 to 13%. The warm, dry long product can still pass on the bars in the storage bins and remains there for several hours and optionally overnight, in order to remove residual stresses in the moisture equilibrium with approximately 55 to 65% reactive atmospheric humidity at ambient temperature or slightly above the latter. The thus "stabilized", i.e. less pressure-endangered finished product, is then delivered to the packing machines.

According to the present prior art, drying takes place for 8 to 12 hours at a temperature of 70° to 75° C. Although Swiss Patent 303,652 refers to a treatment temperature of up to 110° C., this known process is controlled in such a way that pasting of the pasta product takes place. Inter alia, this leads to a reduction of quality. Due to the problems indicated therein at higher temperatures, as yet no process is known permitting a drying at higher temperatures and with short drying times, because hitherto an increase in the temperatures has always led to quality losses, particularly with respect to the appearance of the product (colour, surface characteristics). However, a high drying temperature also appeared disadvantageous for the following reasons. Then the long products pass 8 to 12 hours in the drier, faults e.g. in the conveying system have a very serious impact. Thus, not only can a complete day's production of 15 to 20t of pasta products in the case of large plants become unusable, but the complete pasta material must be individually manually removed from the bars of the conveying means. Thus, in the case of higher temperatures, the complete installation must be cooled to an acceptable temperature prior to the elimination of a mechanical fault in the interior.

Of late, various attempts have been made to optimize the production of long pasta products. As in many natural products, the hitherto stepwise groping towards a different technology solution was extremely difficult or even doomed to failure, because consideration had to be given to too many influencing parameters and for systematic reasons only 1 or 2 parameters could be changed in each test. Thus, the optimum point was often surprisingly far removed from the standard practice. However, all the intermediate variations of the parameters only led to inferior results. Therefore, hitherto in connection with long products, a temperature of 80° C. has been looked upon much as a sound barrier for obtaining qualitatively high-grade products and it was considered disadvantageous to exceed this temperature. This was attributed to the fact that the gluten protein, which can represent 70 to 80% of the protein content, is even more extensively denatured during each temperature increase. This was proved by solubility tests, e.g. with dilute acetic acid. Protein coagulation advanced rapidly at temperatures over 50° and up to 60° C. Deficient products were always obtained in the many practical tests made to exceed temperatures of over 60° C. People with a particularly highly developed taste-differentiating evaluation capacity stated that the long products had a rubbery texture on biting and a low acidity was established. Thus, the consumer refused long products produced in this way. It is no longer possible to establish what were the decisive criteria which have hitherto prevented the introduction of a process for drying and producing qualitatively high-value and particularly colour-perfect long products in a temperature range of approximately 80° to 100° C.

DISCLOSURE OF THE INVENTION

The problem of the invention was to so improve the aforementioned process, that it could be performed in a substantially troublefree simple, economic and particularly rapid manner, whilst maintaining the quality standard expected of the product. In addition, the invention proposes a suitable apparatus for performing this process.

According to the invention, this problem is solved in that the long product leaving the press head is heated as rapidly as possible in a first climatic zone, but in more than 10 minutes to a temperature of more than approximately 80° C. under the action of a heating medium with a relative humidity of approximately 60 to 80% and then in a second climate zone under the action of a drying medium with a temperature of over approximately 80° C. and a relative humidity of approximately 65 to 85% is dried to a moisture content of less than approximately 14% by weight, or to avoid undesired reactions over approximately initially to a moisture content of less than approximately 18% by weight and then at a lower temperature to a final moisture content of less than approximately 14% by weight.

The apparatus according to the invention is characterized in that the long product drier is constructed as a single-level drier, which has a rapid heating zone and an intense drying zone.

According to the process of the invention, a long product with a moisture content of less than approximately 14% by weight and particularly approximately 11 to 13% by weight is sought. In many countries, there are legal requirements concerning the final moisture content, so that in Switzerland and the Federal Republic of Germany a value of approximately 12.5% by weight is required. From the purely technical standpoint (and also as a quality requirement), the level should always be below approximately 14% by weight. Generally, there should be no drop below a moisture content of 11% by weight, because drying at too high a temperature is equivalent to a weight loss with respect to the legal values. The value of approximately 12.5% by weight can be looked upon as optimum.

The starting material for the process according to the invention is the partially plasticized or moist-plastic soft dough strands leaving a press head. Then the present invention refers to "plastic", it is to be understood to mean a physical state, which inter alia is a function of temperature and moisture content. The term plasticity is fundamentally understood to mean the property of solid materials to undergo permanent deformations, under the action of external forces. The moist-plastic dough strands generally leave the press head at a temperature of approximately 40° to 50° C. Higher temperatures are to be avoided, because they give rise to undesired changes in the product to be dried, which impairs the finished product quality.

According to a preferred development of the process according to the invention, after leaving the press head, the dough strands undergo surface treatment by an air stream, accompanied by a moisture loss of approximately 1 to 2% by weight. This inter alia removes an undesired moisture formed between the dough strands and in this way a certain climatic stabilization is achieved. The ventilating air can be preferably brought to approximately 40° to 60° C. to prevent the cooling to roughly 30° C. which generally occurs. Such a cooling would have to be compensated again in the following rapid heating zone, which would be contrary to the objective of the invention. The treatment with ventilating air following the press head generally lasts approximately 6 to 10 minutes and leads to a surface drying. This measure can prevent "drop formation" which occurs in individual cases.

The dough strands leaving the press head and which may have undergone surface treatment with ventilating air in the aforementioned manner are placed mechanically over a bar attachment means and are then directly cut on reaching the desired leg length (accompanied by the formation of a U-shape). The dough strands are cut in such a way that there is an adaptation to the dimensioning of the following units in the heating and drying means.

A necessary requirement of the process according to the invention is that the dough strands leaving the press head and cut to the desired length on the bar attachment means are subject to rapid heating to a temperature of more than approximately 80° C. Rapid heating generally takes pace in a range of approximately 80° to 140° C., particularly approximately 80° to 120° C. and in a particularly preferred manner approximately 95° to 120° C. The time during which rapid heating takes place is obviously dependent on the sought final temperature, as well as the temperature conditions on heating. However, it should be at least approximately 15 minutes, preference being given to the range 15 to 60 minutes and in particular preference to the range 15 to 30 minutes. The heating medium is air with a relative humidity of approximately 60 to 85%, preference being given to the range 65 to 75%.

On setting the desired minimum temperature of approximately 80° C., various conditions must be respected in connection with the rapid heating. If the temperature in the first climate zone, in which rapid heating takes pace, is identical to the sought final temperature, this could lead to the coder dough strands exhibiting a considerable condensing out of water, so that an excessive film of water is formed. Although the water of this film could to a certain extent be absorbed by the dough strands, it would not be possible to prevent an undesired caking. In addition, the so-called dripping or dropping could occur, which is also undesired. However, if the heating temperature was controlled in such a way there in the first climate zone that it was very close to the particular product temperature, then as a result of the limited temperature difference the rapid heating necessary for achieving the objectives of the invention would not be possible or would scarcely be possible and there would be considerable drying during the heating period and said drying should in fact take place in the following treatment in the second climate zone.

In order to achieve an optimum process guidance in the first climate zone in the sense of the invention, there are preferably temperature jumps in said first climate zone. The optimum number of temperature jumps is dependent on the particular sought minimum temperature. Four or more temperature jumps are considered to be advantageous. If e.g. a minimum temperature of approximately 95° C. is sought, then it is advantageous in each case to choose four or more temperature jumps. The processes of moistening by condensation phenomena and drying take place in the individual zones of the different temperature jumps on the surface of the long products in the form of moist, soft-plastic dough strands. It must be ensured that moistening does not lead to the excessive formation of an aqueous film with the aforementioned disadvantageous phenomena, e.g. dripping. Thus, it is advantageous if the wet bulb temperature (dew point) of a following higher temperature climate zone is below the dry bulb temperature of the preceding climate zone. In other words, the temperature of the air introduced into the following climate zone must not be raised above the wet bulb temperature difference $\Delta T$. If this condition is respected, then the otherwise undesired water vapour condensations occurring to a considerable extent on the walls of the container of the first climate zones are largely prevented. If water vapour condensed on the walls, it could drop onto the heated dough strands and lead to various disadvantageous effects, such as e.g. the aforementioned dripping. On optimizing the process according to the invention in the first rapid heating climate zone, the sum of the individual $\Delta T$ values (wet bulb temperature difference of the individual, differently temperature-controlled climate zones) would be the same or slightly higher than the total temperature rise of e.g. approximately 40 to 50% to at least approximately 80%.

On proceeding in the aforementioned manner in the first climate zone using at least one or preferably several and in particular more than four temperature jumps, then the sought rapid heating would be achieved, whilst minimizing the drying effect, so that the completely heated dough strands regularly have a moisture content of approximately 24 to 27% by weight at the end of the first climate zone.

However, the aforementioned advantageous rapid heating utilizing temperature jumps in the first climate zone in no way represents the sole possibility. As is readily apparent to the expert, rapid heating can take place in many different ways. Thus, it would fundamentally also be conceivable to regulate the ambient temperature medium in the form of e.g. air with the aforementioned moisture content in such a way that there is a gradual (continuous) temperature profile, but which has an adequate difference compared with the temperature profile of the material to be heated in order to achieve the sought rapid heating. This means that there is an adequate temperature difference between the product and the surrounding heating medium at all points of the heating zone. In order to extensively suppress the drying effect in the first climate zone which cannot be completely prevented, it is advantageous within the scope of the invention to set the relative atmospheric humidity in the heating climate to approximately 60 to 85%. In this case, heating could take place with superheated steam. At the end of heating, there is still a substantially soft, moist and partially plasticized material.

On treating the long products in the first climate zone, as well as in the following climate zones, it has proved particularly advantageous if the air stream in the various climate zones is zonally directed at right angles to the long products and part of the air is introduced and removed in the sense of a turbo-system through ducts inside and outside the drying area for the purpose of controlling the climate of the particular climate zones.

The long product leaving the first climate zone with a temperature of more than approximately 80° C. is subsequently subject to an extremely rapid drying at this elevated temperature and in the plastic state. The main drying always takes place in the second climate zone, in which the drying medium has a relative humidity of 65 to 85% and preferably 70 to 80%. The original moist or soft-plastic material is subject to a more extensive plasticization and in the final stage a thermoplastic product is obtained. If the latter is cooled to ambient temperature, it exhibits stability. It is generally recommended to maintain the product temperature set in the first climate zone in the second climate zone. Reference is made in this connection to the temperatures of temperature ranges mentioned in connection with the first climate zone. The treatment time is selected as a function of the treatment temperature in the second climate zone. This treatment time should regularly be 30 minutes or more and generally the range 30 to 120 minutes is advantageous. Particular preference is given to the range 30 to 60 minutes. These are particularly preferred times for the drying temperature of approximately 80° to 100° C., particularly 85° to 95° C. This provides a process product with the desired moisture content of approximately 14% by weight, particularly 11 to 13% by weight.

As a function of the starting material used, in individual cases undesired reactions can take place at elevated temperature, particularly if thermally unstable additives, such as e.g. egg additives, milk proteins, etc or raw fibres are admixed with the dough and then drying at lower temperatures is necessary to maintain the final quality. Preferably, the long product is intensely dried in less than 1 hour to a product moisture content of approximately 18% and then for 1 to 4 hours, preferably 2 to 3 hours and at a temperature of approximately 75° C. to the final moisture content of less than 14%. It is appropriate in such cases to initially lower the moisture content in the drying temperature range to approximately 18%. The now thermoplastic product is treated in the following third climate zone at such a reduced temperature that the undesired browning reactions and other reactions are largely excluded, whilst ensuring a relatively rapid performance of the process, whilst maintaining a high quality product. At this reduced temperature, the moisture content is set at less than approximately 14% by weight, preferably approximately 12.5% by weight. It has been found that the latter drying measure is advantageously performed at a temperature below approximately 75° C. The comments made hereinbefore regarding the drying medium of the second climate zone, particularly with respect to the relative atmospheric humidity apply accordingly. As the undesired browning reactions take place to a greater extent with dropping moisture content and at high temperatures, it can be advantageous to provide one or more temperature jumps in the third climate zone. The additional final drying in the aforementioned third drying zone generally lasts approximately 2 hours at 75° C. and approximately 4 hours at approximately 65° C. whilst attempting to avoid further drying, the long product is then cooled to maintain the sought moisture content.

The cooling of the completely dried long product can e.g. take place in a cooler with subsequent stabilization in storage bins in moisture equilibrium with approximately 55 to 65% relative atmospheric humidity at ambient temperature or slightly above this temperature, in order to obtain a stabilized product without residual stresses. All that is decisive is that diffusion processes and the surrounding atmosphere lead to no significant moisture quantities being removed from the finished product, whist maintaining the sought moisture content. The cooled product can then be cut to the desired length in conventional manner.

The process according to the invention can be carried out with particular advantage with the single-level drier subdivided between the rapid heating zone and an intense drying zone.

The basic principle of the invention offers a large number of advantages and in particular allows many further combinations. The air and climate control can take pace in a panned manner by means of the single-level drier, particularly if the air circulation is at right angles to the direction of movement of the long product. The climate can be randomly finally controlled and regulated with advancing drying processes with respect to all the parameters, such as air speed, air moisture content and air temperature. This also makes it possible for the first time to have a design with complete automation, i.e. with the automatic control on the basis of the conditions required by the product. It is particularly advantageous to combine the single-level construction with so-called turbo-air guidance. The single-level drier also permits automatic product monitoring for the first time, e.g. by measuring the product moisture content and/or colour, both in the rapid heating zone and in the intense drying zone. Preferably, the rapid heating zone and the intense drying zone are equipped with an air circulation system in such a way that the air is passed through the product vertically from top to bottom or from bottom to top.

It has proved particularly advantageous to control the air with the aforementioned turbo-system by means of an air compressor and/or fan. Control is preferably by a central computer and controlled in this way is blown into the individual climate zones of the rapid heating zone and the intense drying zone. The rapid heating zone and intense drying zone are preferably equipped with longitudinal ducts for fresh air and spent air. In this arrangement, this makes it possible to so regulate the climate in each stage of the rapid heating zone and intense drying zone, that the corresponding climatic conditions can be regulated in an optimum manner. Thus, according to the invention, there can be no overpressure or underpressure in the drying zone or the individual sections.

The apparatus according to the invention with devices for controlling the climatic conditions in the individual circulating air zones, as well as rest zones, is achieved by a planned fine dispersion of the supply air and the controlled removal of spent air from the individual climate sections using the corresponding longitudinal ducts. For regulating the supply or spent air stream, the apparatus has connecting ducts with respect to the longitudinal ducts with controllable pressure regulating means for the zonal climate control in the sense of the aforementioned turbo-system.

It is advantageous if the apparatus having a rapid heating zone and an intense drying zone is supplied with circulating air for fresh and spent air and has throttle and control flats, as well as a fresh and/or spent air heating device for preventing condensate formations. It is also favourable if the fresh air-spent air system can be short-circuited for climatic preparation, control and extension. It is also appropriate within the sense of the invention for the apparatus to be preferably equipped with steam moistening controlled by the central computer for controlling and regulating the individual climatic conditions or climates of the rapid heating and intense drying zones.

For optimizing the system, the longitudinal ducts of the rapid heating zone and the intense drying zone have adjustable slides in each ventilated element.

As described hereinbefore, to ensure an optimum control of the drying zones for the spent air and fresh air, a turbo-system superimposed on the circulating air is used with particular advantage. It is appropriate for the arrangement of this system in the apparatus according to the invention for energy reasons and in view of the aforementioned condensation problems if the longitudinal ducts of the turbo-system for spent and fresh air are arranged in the drying chamber of the single-level drier. In an optimum arrangement of the apparatus according to the invention air mixing units, heating elements, compression and suction units of the turbo-system are incorporated into the spent and fresh air ducts within the drying chamber of the single-level drier. Thus, energy losses are reduced to a minimum.

It can be appropriate from the mechanical and operational standpoints for the air mixing units, heating elements, as well as compression and suction units of the turbo-system to be arranged in ducts outside the drying chamber. It is obvious that these elements are correspondingly insulated, in order to prevent or exclude heat losses.

The aforementioned rapid heating zone is also of particular importance for the invention and preferably has one or more zones at different temperatures. Reference is made to temperature jump sections with temperature jumps of approximately 4° to 12° C. These temperature jump sections are set in such a way that between adjacent climates at different temperatures, there are no so-called dew point zones and consequently no condensate formation in the various circulating air zones or conditions, so that the undesired wetting of the product to be dried is prevented.

As a result of the inventive concept, it is low possible to completely utilize the technological possibilities of the process for producing pasta products and to improve them in such a way that, whilst retaining the high quality requirements made on the process product, a substantially troublefree, simple and economic process control can be achieved. In order that this can be achieved at the selected high temperatures and with the short production times, preferably product measuring and monitoring equipment is used, which are e.g. evaluated by means of a central computer and used for automatically regulating the drying parameters. This obviates the need for the dough expert to carry out routine checks.

In order that the product to be dried can be subject to checks and inspections, in the rapid heating and/or intense drying zone is appropriately provided an automatic bar removal means which removes the product from the single-stage drier in such a way that in the vicinity of the rapid heating zone and in the intense drying zone, there is at least one automatic bar removal means. This automatic removal of a bar from the single-level drier permits an exact, controlled monitoring of the product. To ensure that there are no undesired product losses (the product on the bar can amount to 3 to 6 kg) and so that there is no hole in the product during the further process sequence and so that the product of the same bars can be checked a number of times, the bar removal means preferably has an automatic bar return to the corresponding zone.

It is particularly advantageous with a view to a more extensive automating of the overall apparatus, if the automatic bar removal means has product measuring and/or monitoring equipment for the product quality for controlling or regulating the drying parameters (climate).

Figure 4:
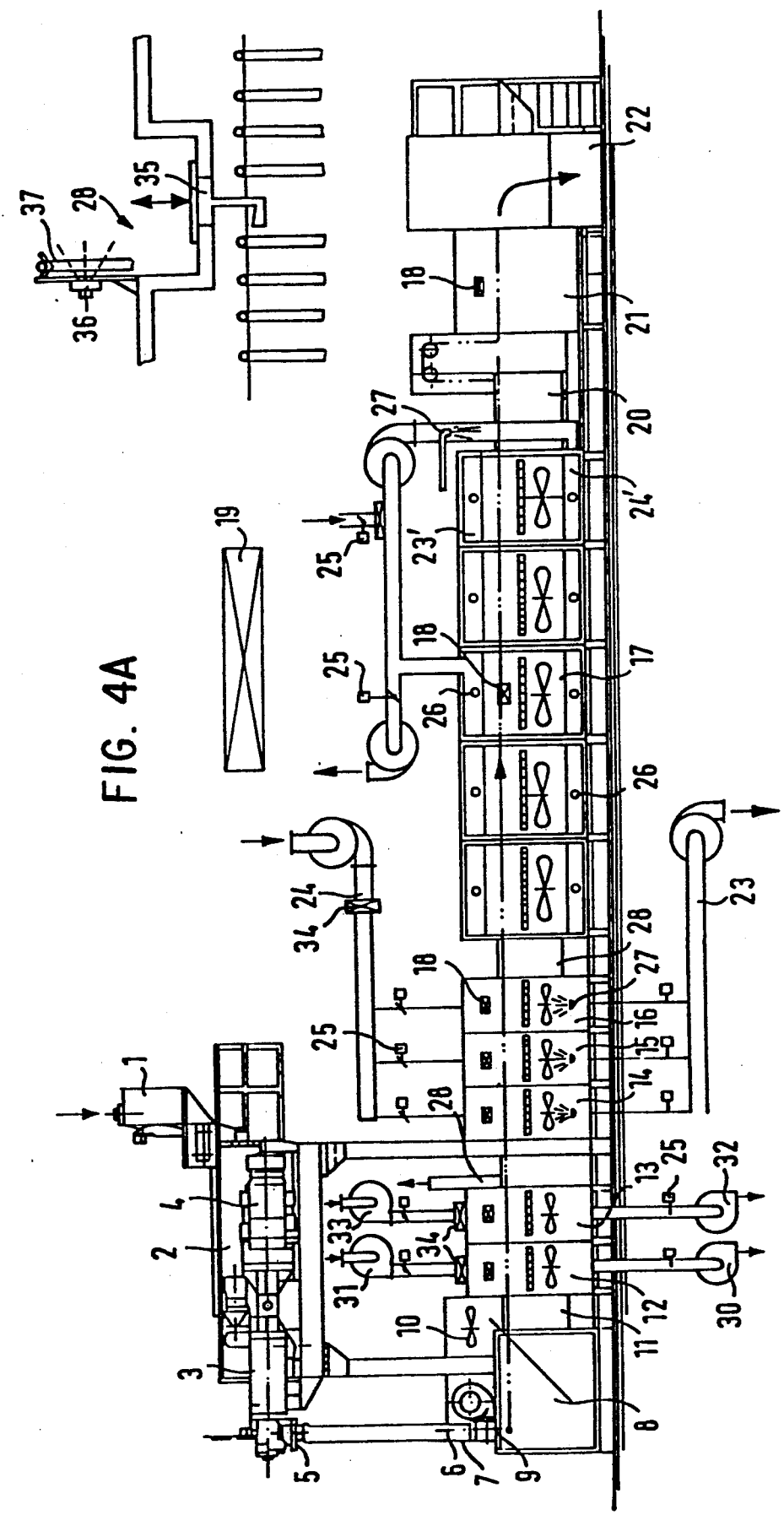

The corresponding arrangements of the bar removal means are shown in FIG. 4, relative to position 28 and at the top right positions 35/36/37. A tappet hook 35 takes up a suspended bar from the single-level drier. The long product 37 is checked in the rest state with measuring device 36 with respect to the desired product parameters (temperature, moisture, colour, starch, protein, ash, etc). If the bar is returned, it remains on the tappet hook 35. The checks are made, whilst a sample is taken for the laboratory and this can also take place automatically. Following the checks, the bar is returned to its position in the process and is optionally controlled again in a further drying portion.

The advantages linked with the invention are in particular that it is possible for the first time to obtain high quality long products, in much the same way as in the bread baking oven, at least in the main part of the drying, in a one-level, elongated drying tunnel, without providing the previously described rest zones. The process control is roughly 4 to 8 times shorter than in the prior art processes. As in this case all the bars of the bar attachment means are moved in the same forward direction, few breakdowns occur. This is due to the fact that most of the bar transitions and reversals are eliminated. This permits a continuous process control, because the climate in the individual climate zones can be locally better controlled. There is also an energy saving, if the heated, climatically controlled bar attachment means is positioned as the first section directly upstream of the first climate zone or the rapid heating zone. The climate in the represented individual climate zones can be optimally adapted by mixing, heating or moistening to the necessary extent, air being usable in a maximum manner as a carrier of heat and moisture. Thus, the complete drying process can be controlled in a very economic manner, a plurality of easily performed measures permitting an optimum adaptation and utilization of the particular circumstances. A process product is obtained, which satisfies the highest quality requirements. It has an attractive colour, excellent biting and cooking stability, as well as minimum slime formation during cooking. The process according to the invention will be technologically illustrated hereinafter with respect to these advantageous properties of the process product and reference will be made to a number of few findings.

The present invention has led to a number of new and valuable findings, particularly a general clarification of the production of long products. The vital point for al the physical tests (feel in the mouth, biting stability, taste, colour, etc) for all traditional foods is maintaining the customary quality. It is difficult for humans to digest raw cereal starch. Therefore, bread is baked and pasta products are cooked. The protein is denatured during baking and cooking, so that it can be left to the economic control of the operation as to which industrial process stage is used for the complete or partial denaturing. It has proved very important for an optimum final quality and for a problem-free drying of the pasta products that the best possible protein network is produced at the time of dough preparation and compression. This is achieved in that at the compression pressures in the press, a temperature of approximately 50° C. is not exceeded. If the long product leaves the press at e.g. 45° C., the gluten protein is still "live", so that it is possible to fully utilize the reactivity inherent in such a protein in order to build up a very fine-mesh, three-dimensional protein network. The prerequisite is that no mechanical-thermal deformation forces act on the dough parts, the dough strands being hung on the bars immediately following the pressing process and they remain there until they are sufficiently dried and then not only is the protein network fully maintained but, as tests have shown, is formed to an even more intense extent if the drying is terminated in less than roughly 2 hours e.g. substantially between approximately 80° and 100° C. The final phase of stabilization, during which 1 to 2% moisture is removed, leads to no disadvantages, because temperatures below roughly 65° C. are used and in part circulating air.

Gluten protein starts to coagulate at temperatures above approximately 50° to 60° C. The press-warm long products (approximately 45° C.), preferably directly following the pressing process, are heated for 15 to 30 minutes and 65 to 75% relative humidity to above 80° C. and then dried to a moisture content of approximately 14% at e.g. approximately 85° to 95° C., so that the protein network is made firm or strengthened. The cooking characteristics are improved and these pasta products are not easily damaged by cooking. The starch is only dissolved out to a minimum extent during the cooking process and the biting stability remains good.

The gluten network prepared in the press gives an adequate strength as a result of the coagulation of the long product with drying to ensure that the dough strands do not break off from the bars as a result of their own weight.

Although according to the invention, the hitherto necessary encrusting of the partial surface is completely avoided and the starch has reduced cohesiveness at higher temperatures, this surprisingly leads to no disadvantage. Research has shown that in the case of rapid, but not excessively rapid drying in the heating zone, there is a permanent change or restructuring of the internal binding forces. Immediately following the press, there is a uniform structure of the protein or gluten network and starch granules, as well as finely dispersed water. The gluten network can be compared at this stage with a rubber body, i.e. an elastic body. However, during longer heat action, corresponding to the boiling of eggs, its strength increases as a result of the coagulation process. The protein coagulation problem also occurs when producing "egg soup". The starch corresponds to a crystalline substance. The still live protein and the high proportion of water give the freshly pressed long product a moist-plastic behaviour. With increasing temperature, the crystalline structure of the starch is loosened and the hydrogen bonds are also loosened. However, an adequate strength remains due to the advancing drying process.

Through the avoidance of dry crusts on the dough surface, the pores remain free through to the dough surface, so that in the high temperature range (e.g. 80° to 100° C.) the loosening of the hydrogen bonds, linked with the softening of the starch structure, can be utilized for rapid drying, without requiring very large vapour pressure differences between the product and the drying air during the main drying. The best values were obtained with a relative atmospheric humidity of approximately 70 to 80%.

Microscopic sections with corresponding colours have also shown that long products produced according to the invention are subject to no tasting and also no disturbing starch change and in particular have a largely set protein network and a quality which is equally as good as the best hitherto obtained long products. This is surprising because the biological, chemical and physical processes between the raw dough and the dried pasta product are recognized as being extremely complex. A starch granule generally has a diameter of 5 to 50 μm, the thickness of e.g. spaghetti is between 1.6 and 2.5 mm. In the case of good quality, it is required that also in microscopic section, the characteristics of the pasta product are uniform from the centre to the outermost marginal area, with no crack or bubble formation, which would lead to damage during prolonged storage. Pasta products are a standard stockpiling product for emergency supplies. The invention offers special advantages with regards to hygienic and microbiological questions and the treatment corresponds to an excellent pasteurization.

The invention has in particular provided a definite clarification of the biochemical process in pasta product production. In the early times of pasta product production, it was necessary to accept drying times of sometimes several days, with ambient temperatures of less than 50° C., together with a difficulty controllable acid fermentation which, if lactic acid is only formed in trace form may be attractive to the gourmet, but often led to inferior and excessive "acid" pasta products. The further additional enzymatic oxidation reactions in the direction of enzymatic browning and colour decomposition are completely undesired. Such climatic conditions are also an ideal incubator for bacteria, including pathogenic agents, such as salmonella and staphylococci. However, on maintaining the drying process for too long at temperatures over 70° C., the Mailliard reaction occurred, in much the same way as when baking or roasting and when baking bread and which led to a brown colouring. However, in carrying out the complete production process at between 81° and 100° C. with the product in the moist state, yellow pigments came to bear and provided the one product with an attractive appearance. In addition, this treatment in this temperature range has a pasteurizing effect on the product. However, this presupposes completely controlled conditions throughout the production process, in accordance with the present invention. The essential point is the automatic control of each climate zone, so that the conditions according to the invention are strictly adhered to. It is particularly advantageous for the long product to be guided at a moisture content of less than 18% and preferably less than 14% in one eve through a longitudinal movement through the different climate zones. The air flow in the various climate zones is zonally directed perpendicularly to the long product in such a way that part of the air is introduced and removed by ducts for controlling the climate of the individual climate zones passing inside and/or outside the drying chamber in the sense of a turbo-system.

Due to the fact that, according to the invention, the soft, moist-plastic pasta product is very rapidly brought to a temperature of more than approximately 80° C. without any significant drying and is then dried there within a short time, no cracks, stresses or bending have occurred on the long product. Thus, the individual dough strands thereof remain absolutely straight, because a bent product would be susceptible to breakage. In addition, in the case of irregularities, it would have a greater risk of the individual dough strands sticking together.

The invention is described in greater detail hereinafter relative to the drawings, wherein show:

FIG. 1 diagrammatically, a longitudinal view of the apparatus according to the invention with a rapid heating zone equipped with charging valves.

Figure 2:
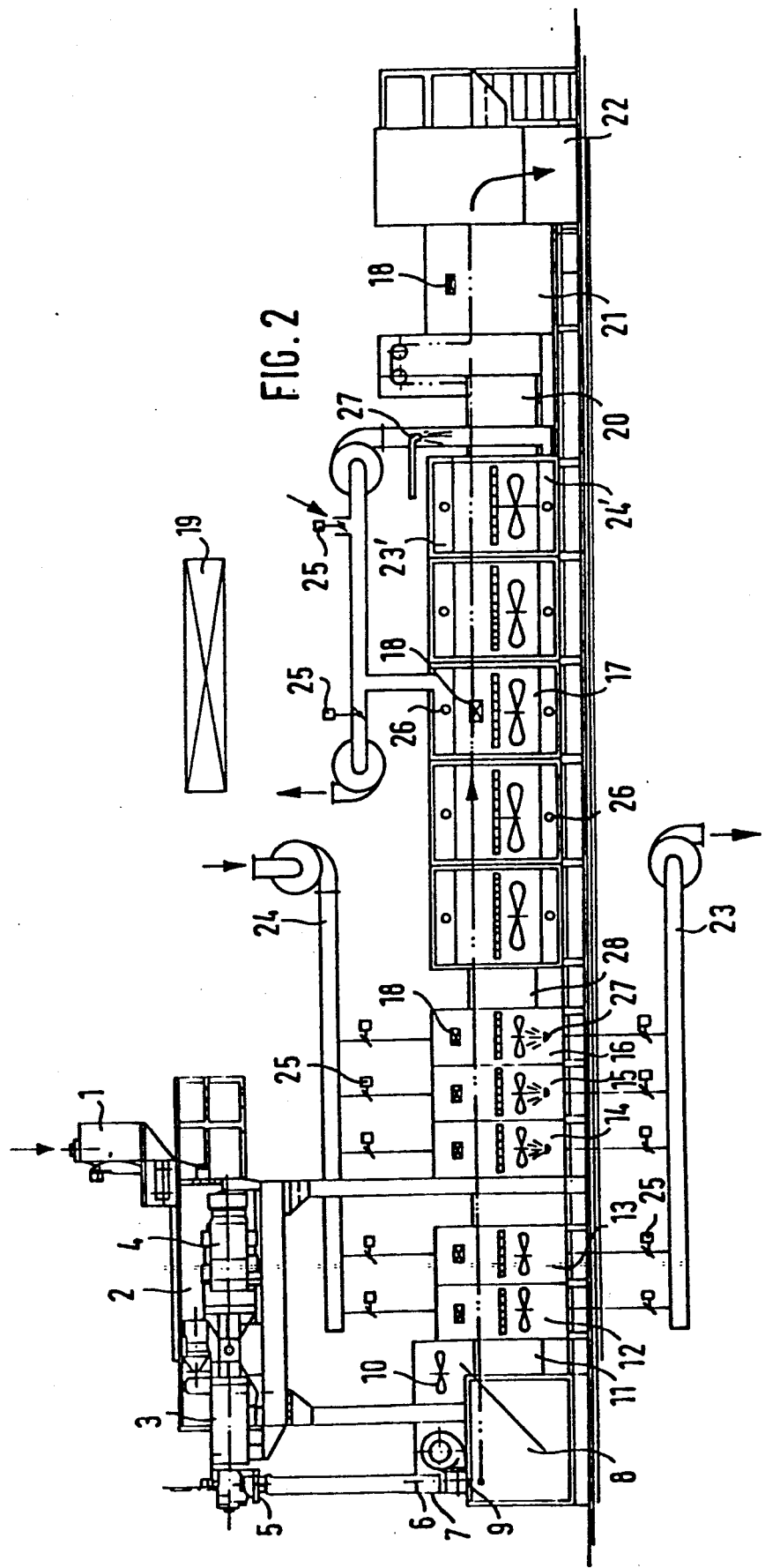

FIG. 2, as FIG. 1, but with a charging valve-free rapid heating zone.

Figure 3:
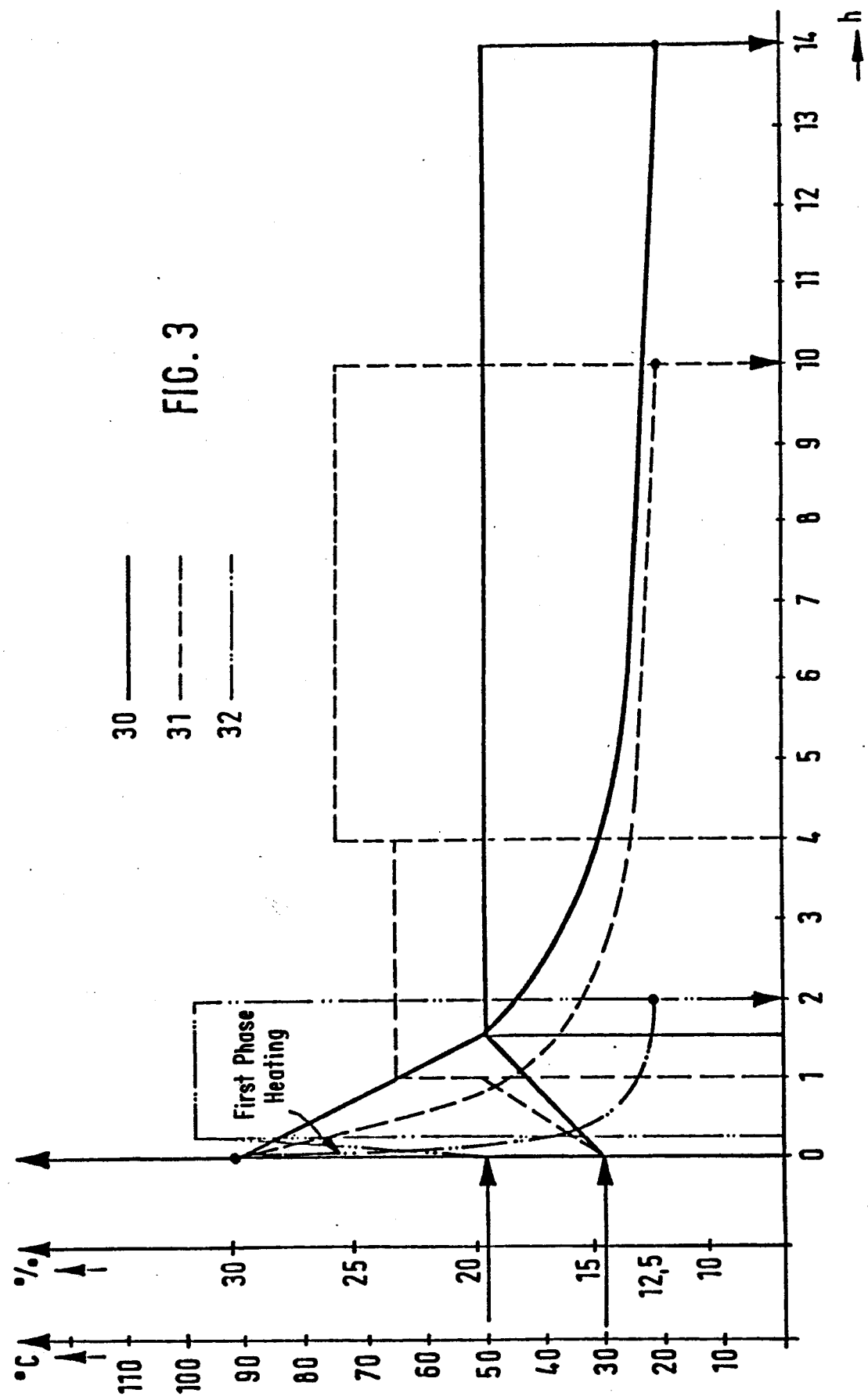

FIG. 3 the configuration of the drying curves in the known process and in the process according to the invention, in the form of a graph.

FIGS. 4a and 4b, as FIG. 2, but with modifications (bar removal) means, as well as supply and spent air system).

Figure 5:
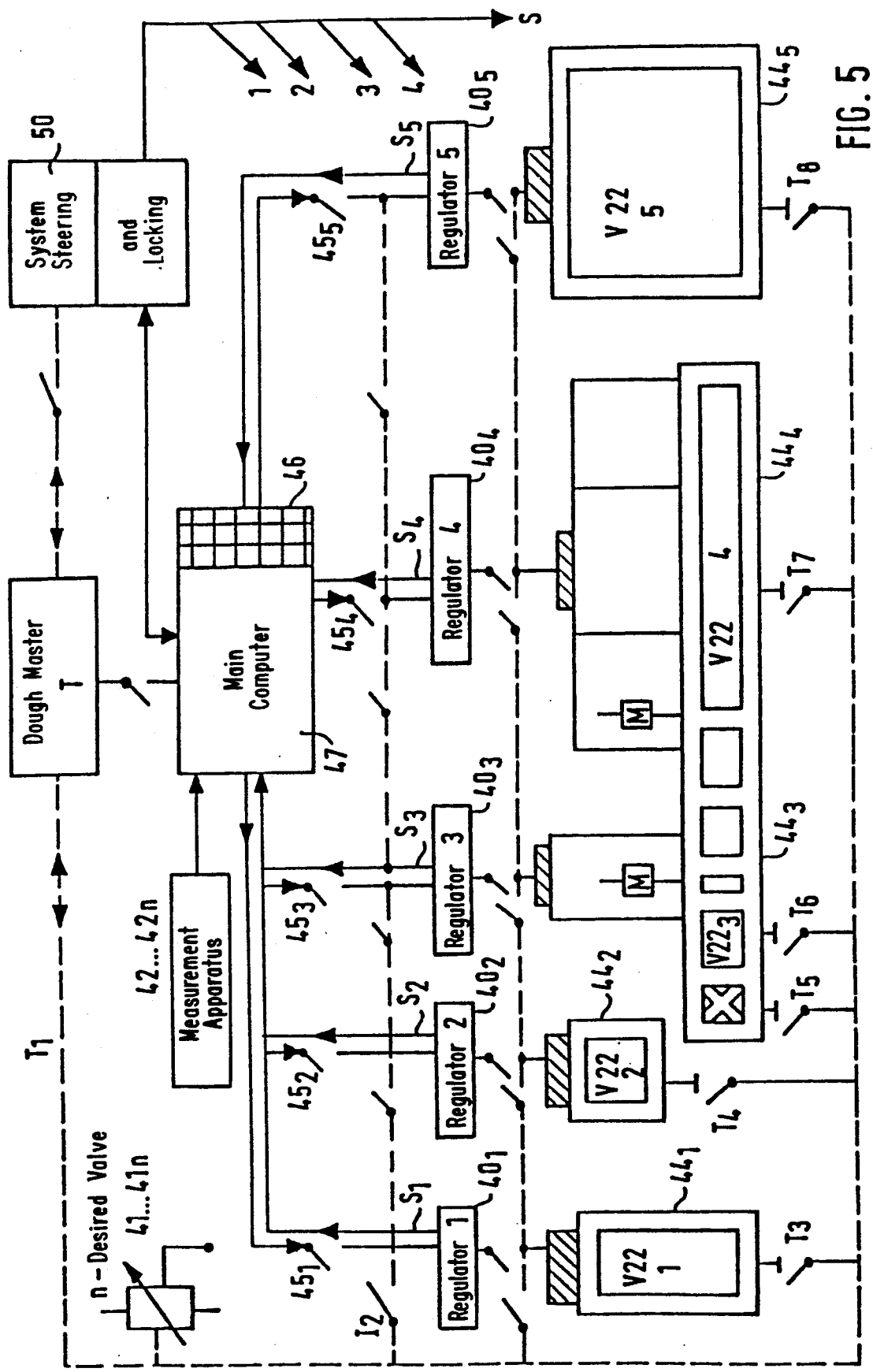

FIG. 5 diagrammatically, a monitoring, control and regulating means for the apparatus according to the invention.

According to FIGS. 1 and 2, the raw material in the form of grits, water and eggs is introduced by means of a dosing mechanism 1 into a mixing trough 2, from where the pasta product is fed into a long product press 3 with a press drive 4. On leaving the long product press 2, the long products, e.g. spaghetti, are brought into the desired form and ar cut to the desired length of e.g. 30 to 50 cm by means of a cutting apparatus 6. The still not complete long products or pasta product strands leave the mould 5 at a temperature of approximately 40° to 50° C. In order that at this point there is neither a sticking, nor a cooling of the long product, the latter is passed directly through an inlet duct 7 into a conditioned attachment means 8. Between inlet duct 7 and attachment means 8 is provided a fan 9, through which heated air is blown against the product. From attachment means 8, the long product passes into a feed element 11, in which once again heated air is blown against the product by means of fan 10. From here, the long product is passed into a rapid heating zone 12, 13, 14, 15, 16 and subsequently to the main drier 17, which has a plurality of ventilated elements.

As a function of the desired drying temperature in the main drier 17, the product can be brought to 90° to 120° C. in a varying number of temperature jumps of initially e.g. 40° C.

The apparatus according to the invention, whose essence represents a novel long product drier, has as its main feature a long, continuous, single-level drying tunnel. Corresponding to the movement of the loaf in an industrial continuous baking oven, the long products, suspended on bars, move in the longitudinal direction. However, the air is blown from top to bottom or bottom to top through the drying tunnel. Each climate zone is equipped with a temperature and moisture probe 18 and is regulated with a central, microcomputer-controlled climatic regulating means 19 in order to maintain the desired conditions in the drying stage. For this purpose, it is necessary to regulate the desired temperature by means of heat exchangers 29 and the desired atmospheric humidity by means of vapour or fresh air in each drying section. If large climatic jumps are necessary, then elements with charging valves 13, 15 (FIG. 1) could be provided in the heating zone.

At the end of the main drying, there is a charging valve 20, followed by a cooler or shape stabilizer 21. The end of the complete drying line is formed by a cutting machine 22, the product then being supplied to the packing machines.

In order to ensure an optimum control of the drying zone, as shown in FIGS. 1 and 2, a so-called turbo-system is particularly advantageously used for the fresh and spent air and for this purpose ducts 23 and 24 are provided in the rapid heating zone. Through the automatic control of the air flaps 25, the fresh and spent air quantity can be controlled in such a way that there is no overpressure or underpressure, which could lead to an undesired influencing of the climate in adjacent zones. In the multi-element main drying zone 17, the turbo-system is supplemented by an air system, in order to regularly distribute the conditioned fresh air over the entire length of the drier. Ducts 23' and 24' are positioned within the drier and are externally interconnected. Part of the climatically controlled drier air circulates in the said ducts and is prepared by means of fresh air and water vapour. This air can be distributed by means of sides 26 in a uniform manner over the entire length of the drier, even if the latter is very long. It is also possible to dry this circulating air by condensation, instead of supplying fresh air. This can bring about a heat recovery and a corresponding reduction of energy consumption. It is important for hygienic reasons that the point where the condensation water occurs is positioned outside the drier.

In a preferred arrangement, air mixing units, compression and suction means of the turbo system are arranged within the drying chamber.

In order to optimize the process, the climatic conditions of the various zones should be set at the beginning of production. For this purpose, nozzles 27 are provided for injecting vapour or steam. In order to permit a control of the drying process, there is an automatic product removal means 28 between the rapid heating zone and the main drying zone.

If for quality reasons, the product is to be completely dried at temperatures below approximately 80° C., a separately regulated final drying zone can be provided following the man drying zone. This drying zone could comprise a singe-level drier or also a three-level drier and in each case a sensor is provided at the end of drying.

FIG. 4a shows the apparatus of FIG. 2 with modifying supplementary means. A special configuration of the removal means is illustrated in FIG. 4b by position 28 and at the top right positions 35, 36, 37. A detailed explanation of position, 28 has already been provided. As a result of means 31 and 33, fresh air is supplied to the system for preparing the climate, accompanied by heating by element 34. The spent air is removed by means 30, 32. As a result of this regulatable system, it is possible to prevent the formation of underpressures or overpressures in the system.

In FIG. 5, individual process sections are indicated by corresponding blocks, process zone 1 representing the raw material preparation (controlled raw material mixing) of grits, water and other additives, as well as the dosing or metering thereof. The dough preparation of process zone 2 mainly covers the mixing, pressing and moulding. The freshly pressed product is automatically hung on bars and introduced into process zone 3, which represents the rapid heating zone. Process zone 4 represents the actual intense drying. In process zone 5, the substantially completely dried long product is stabilized and is automatically filled into domestic packs or other packs.

A regulator $40_1$–$40_n$ is systematically represented for each process zone. In fact, each individual zone may have a plurality of such regulators, which are combined into an auxiliary computer, optionally coupled to the plant control and locking means 50 and can at least be connected for information flow purposes.

The main computer 47 is constantly connected to a set point store 46 for the filing of individual data and/or programs and for removal thereof. To main computer 47 are also connected measuring devices $42_1$–$42_n$ (or, as in FIG. 4, position 36, product measuring and monitoring means (M) for the product temperature, moisture, colour and product starch, together with protein and ash, etc). A set point indicator $41_1$–$41_n$ for a complete or partial manual operation can also optionally be used in conjunction with measuring means (M).

It is also very important for the signal lines $S_1$–$S_n$ connected from the individual process zones to the main computer 47 to be at no time interrupted. However, the control lines from the main computer to the regulators $40_1$–$40_n$ or process zones $44_1$–$44_n$ are provided with reversing switches $45_1$–$45_n$ or $48_1$–$48_n$ for switching over purposes. A central point of the installation is the interaction of the individual installation elements with the electronic or computer means on the one hand, as well as the dough expert on the other, who can counteract the daily occurring variations as a result of his experience and knowledge of the product and equipment specialties.

Operation can be controlled in the following way. On putting into operation for the first time, all the equipment elements are put into operation in accordance with the locking system. The individual control loops (for regulating the air quantity, moisture, temperature, etc) are then successively manually optimized. The corresponding data are fed into the main computer 47 or the set point store 46 for fixing the set point diagrams (e.g. punched cards).

Production is started by controlling the corresponding production supply and/or dosing elements. On the basis of empirical values, the control and regulating circuits and loops linked with the product parameters are roughly set. The corresponding values can once again be supplied to the set point store 46 or the main computer 47. On the basis of said data, the complete starting production with the corresponding starting program is controlled. At the end of the starting phase, which can e.g. last 1 to 4 hours, the dough expert starts to check the complete production process. He then optimizes the product, air and/or climatic parameters in the apparently relevant or necessary process sections. For this purpose, he interrupts the corresponding control line of main computer 47, e.g. to process zone 3, by interrupting the switching contact $45_3$. Regulator 3 continues with the set point given prior to the interruption of the controlling. The dough expert now supplies an improved set point by corresponding supply to regulator 3 or one of the regulators in process zone 3. The best set points are once again fed into the main computer or set point store for correction purposes. Reversing switch $45_3$ can now be closed again and the corresponding group of regulators can be controlled with the new set points. Optimizing manipulations on the part of the dough expert can be carried out at any time by corresponding operation of reversing switches $T_1$–$T_n$ or $45_1$–$45_n$. It is decisive for this procedure that simultaneously with the fixing of the set point diagrams for the process parameters, the associated diagrams are associated with the input parameters, such as capacity (kg/h), nature and mixture of the raw material (durum, hard and/or soft wheat), water addition and various additives (e.g. salt, etc), as well as the parameters for the product quality (moisture, colour, strength, etc).

If now all the parameters with respect to the entry and removal of the product, as well as all the parameters with respect to the process control are to be determined and established in the set point store, for a repeat of the same product quality, it is possible to callup and use for the new production the set points or desired values previously found as being optimum. This applies for the starting, production and completion diagrams. Thus, the dough expert can much more reliably control the long product line, the computer means, regulators and measuring devices representing valuable aids. He can at any time manually control any point in the process, through disconnecting the electronic automatic means, or alteratively he can allow the plant to operate automatically for long periods. In special situations or emergencies, the dough expert can control the complete plant semiautomatically, without linking the process zones via computer means. It is thereby important that he can rely on the plant control and locking.

The individual curves of FIG. 3 can be interpreted as follows. In the old system, the long products are on average dried for approximately 14 or more hours at 50° C. and in the practised prior art for 10 hours at an average temperature of 65° to 75° C. Then using the process according to the invention, it is possible to obtain a drying time of 1 to 3½ hours at an average temperature of 95° C. The very considerable reduction in the product moisture content in the process according to the invention compared with the conventional systems is very noteworthy. This can be attributed to the fact that in the process according to the invention, during drying, the pasta or long product surface is not encrusted once or several times and the long product dough strands, whilst still press-soft and not completely plasticized, are directly converted into a completely pasticized state and are kept therein at the end of drying in the second heated climate zone. It is obvious that in this plastic state, water expulsion can take pace very rapidly.

We claim:

1. Apparatus for producing long products comprising a press, bar attachment means including removable bars from which the products are suspended while being moved through the apparatus, and a long product drier, the long product drier being constructed as a single-level drier, which has a rapid heating zone and an intense drying zone, the rapid heating zone and the intense drying zone having individual climate zones and being equipped with a circulating air system including means for guiding the air generally vertically through the product and wherein the long product drier has one of: (i) air compressors, and (ii) ventilators, as well as control means for the individual climate zones of the rapid heating zone and the intense drying zone; and
    further comprising, for checking the product in at least one of the rapid heating zone and the intense drying zone, an automatic bar removal device moving selected bars supporting the product out of the single-level drier.

2. Apparatus according to claim 1, wherein the bar removal device has means for automatically returning a removed bar to the corresponding zone.

3. Apparatus according to claim 1, wherein the automatic bar removal device has at least one of: (i) product measuring means and (ii) monitoring means for the product quality, as well as means for monitoring, controlling and regulating the drying parameters.

4. Apparatus according to claim 1, wherein the bar attachment means is positioned immediately upstream of the rapid heating zone.

5. Apparatus according to claim 1, wherein the bar attachment means is constructed as part of the rapid heating zone.

* * * * *